United States Patent
Mehta et al.

(10) Patent No.: US 9,319,754 B2
(45) Date of Patent: Apr. 19, 2016

(54) METHOD AND APPARATUS FOR COORDINATED SPLICING OF MULTIPLE STREAMS

(75) Inventors: Dipankumar Mehta, Mumbai (IN); Devendrakumar Banker, Navi Mumbai (IN); Daljeet Kaur, Mumbai (IN); Rakesh Tripathi, Mumbai (IN)

(73) Assignee: Vubites India Private Limited, Mumbai (IN)

( * ) Notice: Subject to any disclaimer, the term of this patent is extended or adjusted under 35 U.S.C. 154(b) by 227 days.

(21) Appl. No.: 13/266,922

(22) PCT Filed: Apr. 28, 2010

(86) PCT No.: PCT/IN2010/000272
§ 371 (c)(1),
(2), (4) Date: Oct. 28, 2011

(87) PCT Pub. No.: WO2010/125583
PCT Pub. Date: Nov. 4, 2010

(65) Prior Publication Data
US 2012/0047282 A1    Feb. 23, 2012

(30) Foreign Application Priority Data
Apr. 28, 2009 (IN) .......................... 1120/MUM/2009

(51) Int. Cl.
G06F 15/16 (2006.01)
H04N 21/81 (2011.01)
H04N 21/234 (2011.01)
H04N 21/44 (2011.01)
H04N 21/845 (2011.01)

(52) U.S. Cl.
CPC ....... *H04N 21/812* (2013.01); *H04N 21/23424* (2013.01); *H04N 21/44016* (2013.01); *H04N 21/8455* (2013.01)

(58) Field of Classification Search
CPC ...................................................... H04N 21/821
USPC .......................... 709/231–234; 370/471–474
See application file for complete search history.

(56) References Cited

U.S. PATENT DOCUMENTS

2002/0154694 A1 * 10/2002 Birch ....................... 375/240.05
2002/0191116 A1 * 12/2002 Kessler et al. ............... 348/723
2002/0196850 A1 * 12/2002 Liu et al. .................. 375/240.12
2004/0122662 A1 *  6/2004 Crockett .................... 704/200.1

(Continued)

FOREIGN PATENT DOCUMENTS

WO    WO9952067 A2 *  10/1999

OTHER PUBLICATIONS

Kelly D Petal: "Virtual editing of MPEG-2 streams" International Conference on Consumer Electronics. 2001 Digest of Technical Papers. ICCE. Los Angeles, CA, Jun. 19-21, 2001.

*Primary Examiner* — Chris Parry
*Assistant Examiner* — Weiwei Stiltner

(57) ABSTRACT

A method and apparatus for coordinated splicing of multiple streams is disclosed. In one embodiment, a method and apparatus for controlling flow of a plurality of streams of a first data stream is disclosed. Further, a method and an apparatus for selecting splice opportunity points for a plurality of streams of the first data stream is disclosed.

21 Claims, 7 Drawing Sheets

(56) References Cited

U.S. PATENT DOCUMENTS

| | | | |
|---|---|---|---|
| 2006/0188016 A1* | 8/2006 | Gould | 375/240.12 |
| 2006/0203920 A1* | 9/2006 | Yongfang et al. | 375/240.28 |
| 2007/0153914 A1* | 7/2007 | Hannuksela et al. | 375/240.26 |
| 2009/0180549 A1* | 7/2009 | Hosein et al. | 375/240.25 |
| 2010/0043022 A1* | 2/2010 | Kaftan | 725/34 |
| 2010/0189131 A1* | 7/2010 | Branam et al. | 370/474 |
| 2010/0198401 A1* | 8/2010 | Waugh et al. | 700/237 |
| 2010/0254408 A1 | 10/2010 | Kuno et al. | |

* cited by examiner

METHOD AND APPARATUS FOR COORDINATED SPLICING OF MULTIPLE STREAMS

CROSS REFERENCE TO RELATED APPLICATIONS

This application claims benefit of Indian provisional patent application serial number 1120/MUM/2009, filed on Apr. 28, 2009, which is herein incorporated by reference.

FIELD OF THE INVENTION

Embodiments of the present invention generally relate to digital processing techniques, and more particularly to a method and apparatus for splicing a compressed data stream in a digital transmission system.

BACKGROUND OF THE INVENTION

Within a communication system, a network bandwidth plays an important role during the transmission of multimedia signals. Various multimedia services, such as, broadcasting services, video on demand services, video conferencing and/or the like generate the multimedia signals. Generally, the multimedia signal is of extremely large bandwidth and occupies substantial portion of the network bandwidth. Accordingly, various compression standards, such as, Moving Picture Expert Groups (e.g., MPEG-1, MPEG-2), H.26X and/or the like are developed in order to remove data redundancy in the multimedia signal. Various compression techniques, as defined in the compression standards, are employed to generate a compressed multimedia signal. The compressed multimedia signal relatively occupies lesser network bandwidth. Also, the compressed multimedia signal generally includes coded frames, such as, coded picture frames, coded audio frames, coded data frames and/or the like.

Various digital systems have been developed for processing (e.g., broadcasting, splicing and the like) the compressed multimedia signal. On one side, compression techniques reduce the bandwidth requirements of the multimedia signal, whereas, on other side, compression techniques have inadvertently increased the complexity of the digital systems. For example, in a typical splicing operation, the digital system is configured to first decode the compressed multimedia signal and then replace at least one or more frames (e.g., picture frames) of the decoded multimedia signal with the other frames. Further, on completion of the splicing operation, the digital system is configured to re-encode the decoded multimedia signal using the aforementioned compression standards. Such decoding and re-encoding of the multimedia signal affects the quality of the compressed multimedia signal and decreases the efficiency of the digital systems. Also, the digital system requires high end processing units having large computational power to process the compressed multimedia signal.

Furthermore, during the splicing operation, various streams such as, video streams, audio streams and/or the like of the multimedia signal may lose timing synchronization among each other. In a conventional method, the digital system uses a hardware clock as a slave clock to one or more stream clocks to achieve timing synchronization among the one or more streams. The hardware clock adds additional complexity to the digital system.

Therefore, there is a need in the art for a method and apparatus for efficiently splicing the compressed multimedia signal.

BRIEF SUMMARY OF THE INVENTION

A method of splicing a first data stream and a second data stream is disclosed. The method comprising detecting a splice in-point and a splice outpoint within the first data stream, wherein the splice in-point is a frame in the first data stream and the splice out-point is another frame in the first data stream. The method further identifies splice-in opportunity point and a splice-out opportunity point from a plurality of splice opportunity points (SOPs) in the first data stream, wherein the splice-in opportunity point corresponds to the splice in-point and the splice-out opportunity point corresponds to the splice out-point, wherein the splice-in opportunity point and the splice-out opportunity point are frames of the first data stream. The method replaces at least one frame of the first data stream with at least one frame of the second data stream, wherein the replacement of the frames of the first data stream starts onwards the splice-in opportunity point and ends at the splice-out opportunity point; and wherein the first data stream includes a plurality of frames and the second data stream includes a plurality of frames. The method performs the splicing operation without de-packetization of the first data stream. In addition, the replacement of the frames does not require re-ordering of the frames of the first data stream.

In another embodiment, a method and apparatus for controlling flow of a plurality of streams of a first data stream is disclosed. In one embodiment, the method comprises processing at least one access unit of at least two streams of the first data stream, wherein the processing of the at least two streams initiates at start of a leap and wherein the at least two streams includes a plurality of access units. The method provides a leap credit to at least two stream splicing modules at the start of the leap, wherein the at least two stream splicing modules process the corresponding at least two streams during a leap period and the leap credit at the start of the leap establishes the leap period. The method further modifies the leap credit of the at least two stream splicing modules during the leap period and discontinues the processing of a stream of the at least two streams when the modified leap credit of a stream splicing module of the at least two stream splicing modules is less than the amount of duration of the access unit of the stream.

In a yet another embodiment, a method and an apparatus for selecting splice opportunity points for a plurality of streams of the first data stream is disclosed. In one embodiment, the method comprises identifying an anchor stream among the plurality of streams of the first data stream, wherein the anchor stream includes a plurality of access units. The method determines a splice-in opportunity point and splice-out opportunity point within the anchor stream from the plurality of access units of the anchor stream. The method further determines splice opportunity points of at least one stream other than the anchor stream according to the splice-in opportunity point and splice-out opportunity point of the anchor stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
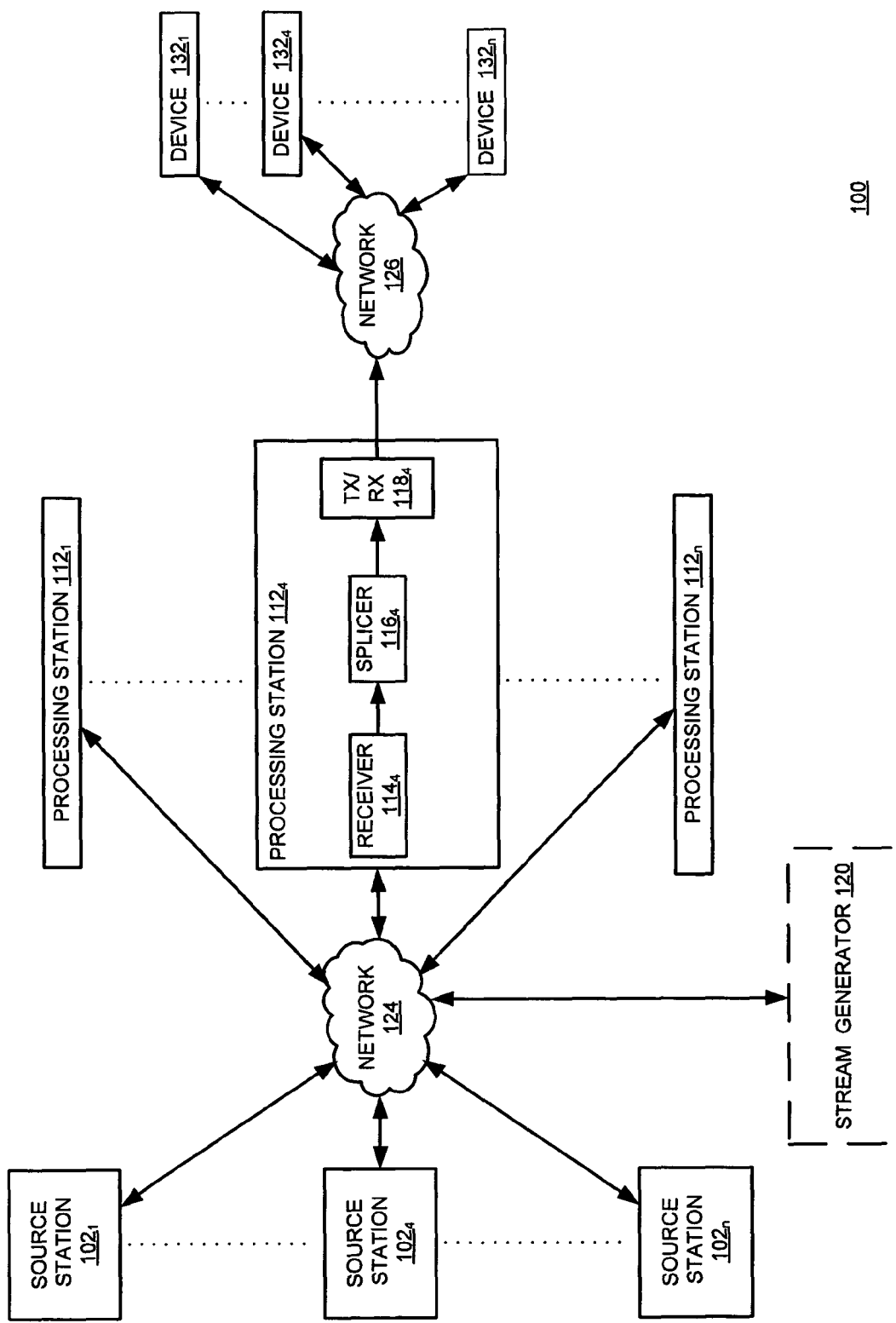
FIG. 1 illustrates a block diagram of an example data stream processing system in accordance with one or more embodiments of the present invention.

FIG. 1 illustrates a block diagram of an example data stream broadcasting system 100 in accordance with one or more embodiments of the present invention. The system 100 is configured to broadcast multimedia services, such as digital television broadcasting, video on demand broadcasting and/or the like to a user. In one embodiment, the system 100 may provide an integrated digital service, such as an internet and/or an intranet access to the user. The data stream broadcasting system 100 includes a plurality of source stations communicably coupled with a plurality of processing stations through a network 124.

The plurality of source stations, such as a source station 102ˆ a source station 1022, a source station 1023, and a source station 102n, hereinafter referred to as the source station 102. Generally, the source station 102 is a broadcasting station, such as, a television broadcasting station, a radio broadcasting station and the like, that transmits a data stream to a plurality of processing stations, such as, a processing station 112i, a processing station 1122, processing station 1123, and a processing station 112π, hereinafter referred to as the processing stations 112. In one example, the source station 102 is a digital broadcast station and transmits a digital data stream to the plurality of processing stations 112. In another example, the source station 102 is an analog broadcasting station that transmits an analog stream to the plurality of processing station 112. As explained later in the description, the plurality of processing stations 112 are configured to perform operations, such as splicing and the like, on the data stream.

In some embodiments, the source station 102 is configured to generate a program stream that includes a video stream having a sequence of plurality of picture frames, one or more audio streams having a plurality of audio frames and associated program clock reference (PCR) streams having a plurality of PCR frames. In one embodiment, the source station 102 may receive the program stream from a production studio. In one example, the production studio may be a mobile production studio adapted for covering entertainment events, such as news, live matches, conferences and/or the like.

The source station 102 is configured to process the program stream using well known compression technologies, such as, JPEG, MPEG (e.g., MPEG-1, MPEG-2, and MPEG-4), H.26X and/or the like. As a result, a compressed data stream is generated. As an example and not as a limitation, in one embodiment, the source station 102 is configured to generate the MPEG compliant compressed data stream. Accordingly, various frames, for example, picture frames, audio frames and associated program clock reference (PCR) streams of a particular program stream are coded in accordance with the MPEG compression standard.

Generally, a particular picture frame of the program stream may be compressed as an intra coded frame (I-frame), a predictive frame (P-frame) or as a bidirectional frame (B-frame). The I-frame eliminates spatial redundancies within the picture frame and is independently coded. As a result, the I-frame does not depend on the other picture frames while decoding at the processing station 112. However, the P-frame and the B-frame are dependent compressed picture frames and may need I-frame and/or P-frame while decoding at the processing station 112. Additionally, the P-frame eliminates temporal redundancies with respect to a preceding compressed picture frame. The preceding compressed picture frame may be the I-frame or the P-frame. Further, the B-frame eliminates temporal redundancies with respect to the preceding compressed picture frame and a future compressed picture frame. The preceding compressed frame and/or the future compressed frame may be the I-frame and/or the P-frame.

Subsequently, the source station 102 is configured to generate a video sequence using the compressed picture frames. The video sequence begins with a sequence header and followed by one or more sets of compressed picture frames. Additionally, the compression standards, for example the MPEG standards, define a group of pictures (GOP) having one or more compressed picture frames of the video stream. The GOP begins with the I-frame, and followed by a certain number of the B-frames and the P-frames. Accordingly, the source station 102 generates an elementary video stream (ES) using the coded pictures frames of the program stream. Further, the source station 102 is configured to compress audio frames and/or PCR frames of the program stream. Accordingly, the source station 102 is configured to generate elementary streams for the audio and PCR streams of the program stream.

Furthermore, the source station 102 is configured to generate a packetized elementary stream (PES) for each elementary stream of the program stream. The PES includes PES packets having a PES packet header and a data payload. The PES packet header includes stream identification (SID) for identifying the one or more elementary streams of the program stream. Additionally, each PES packet header includes timestamps known as presentation timestamp (PTS) and decoding timestamp (DTS).

In addition, the source station 102 is configured to multiplex several PESs having a common time-base called program clock reference (PCR). The source station 102 is configured to further packetize the multiplexed PESs into transport stream (TS) packets and generate a single program transport stream (SPTS) for the program stream. Additionally and/or alternatively, the source station 102 is configured to multiplex one or more SPTS and generate a multi program transport stream (MPTS). Accordingly, the source station 102 is configured to transmit the transport stream (e.g., SPTS, MPTS) as a first compressed data stream to the plurality of processing station 112 through the network 124.

The network 124 comprises a communication system that connects one or more communicable devices such as, the source station 102, the processing station 112 and/or the like, by a wire, a cable, a fiber optic and/or a wireless link (e.g., a satellite link) facilitated by various types of well-known network elements, such as hubs, switches, routers, and the like.

The network 124 may employ various well-known protocols to communicate information amongst the network resources. For example, the network 124 may be a part of the internet or intranet using various transmission systems such as Broadcast transmission systems, which employs various modulation techniques, various interfaces (e.g., Asynchronous Serial Interface (ASI)), transmission means (e.g., RF cables, Optical fibers, Satellite Links) and/or the like. Alternatively, the network 124 may be a part of an Internet protocol network on Ethernet, Wi-Fi or fiber or dedicated lines, ATM networks etc.

According to one or more embodiments, the plurality of processing stations 112 may be located in a plurality of different geographic locations. The plurality of processing station 112 includes a plurality of receivers, such as, a receiver 114*i*, a receiver 1142, a receiver 1143, and a receiver 114*n*, hereinafter referred to as the receiver 114. Each of the receivers 114 is configured to receive the first compressed data stream generated by the source station 102. Further, the plurality of processing station 112 includes a plurality of splicers, such as, a splicer 116*i*, a splicer 1162, a splicer 1163, and a splicer 116*n*, hereinafter referred to as the splicer 116.

In one embodiment, the receiver 114 receives the first compressed data stream and communicates the first compressed data stream to the splicer 116. According to one or more embodiments of the invention, the processing station 112 may use a digital Integrated Receiver Decoder (IRD) device for communicating the first compressed data stream to the splicer 116. Alternatively, the processing station 112 may use an analog IRD device as the receiver 114 and the analog IRD device encodes the received stream as the compressed data stream. Thereafter, the first compressed data stream is provided to the splicer 116. In some embodiments, the receiver 114 achieves demodulation and/or descrambling of the compressed data stream.

Further, the splicer 116 achieves the splicing operation on the first compressed data stream using a second compressed data stream. For example, the splicer 116 may replaces one or more coded frames such as the picture frames, audio frames, PCR frames and/or the like of the first compressed data stream with the one or more coded frames of the second compressed data stream. In one embodiment, the splicer 116 replaces one or more coded frames of the first compressed data stream with filler frames. For example, coded picture frames of the first compressed data stream are replaced with the I-type or P-type picture filler frames. As explained later in the description, the splicer 116 is configured to maintain synchronization among the video stream and the audio stream of the first compressed data stream during the splicing operation.

According to one or more embodiments of the invention, the source station 102 may provide the second compressed data stream. Optionally, the system 100 includes a stream generator 120 for providing the second compressed data stream to the splicer 116. In one example, the stream generator 120 may communicate with the source station 102 for an authorization of the contents of the second compressed data stream.

The system 100 further includes a plurality of transmitter, such as, a transmitter 118*i*, a transmitter 1182, a transmitter 1183, and a transmitter 118*n*, hereinafter referred to as the transmitter 118. The transmitter 118 is associated with the processing station 112. The splicer 116 forwards the spliced compressed data stream to the transmitter 118. Subsequently, the transmitter 118 transmits the spliced compressed data stream to a network 126.

The network 126 comprises a communication system that connects computers by wire, cable, fiber optic and/or wireless link facilitated by various types of well-known network elements, such as hubs, switches, routers, and the like. The network 126 may employ various well-known protocols to communicate information amongst the network resources. For example, the network 126 may be a part of the internet or intranet using various transmission systems such as Broadcast transmission systems, which employs various modulation techniques, various interfaces (e.g., Asynchronous Serial Interface (ASI)), transmission means (e.g., RF cables, Optical fibers, Satellite Links) and/or the like. Alternatively, the network 126 may be a part of an Internet protocol network on Ethernet, Wi-Fi or fiber or dedicated lines, ATM networks etc.

According to one or more embodiments, the source station 102 is configured to insert one or more advertisements within the program stream. For example, during a live coverage—(e.g., a soccer match), a plurality of advertisements are inserted within the program stream. The advertisements are a source of revenue generation for broadcasters. Further, this program stream is communicated as a first compressed data stream to the processing station 112. As an example and not as a limitation, the processing station 112 is a cable head end in a digital transmission system and the cable head end performs a splicing of the first compressed data stream with the second compressed data stream.

In one embodiment, the second compressed data stream includes one or more advertisements that are used to replace the one or more advertisements of the first compressed data stream. In one embodiment, the user can access an advertisement planner tool for scheduling the replacement of one or more advertisements of the first compressed data stream. For example, the advertisement planner tool provides a list of one or more inventory spots (replacement slots) within the first compressed data stream. Inventory spots refer to slots in a broadcast stream available for inserting an advertisement data stream.

In one embodiment, the advertisement planner tool is the advertisement planner disclosed in the provisional patent application titled "Method and apparatus for planning a schedule of multimedia advertisements in a broadcasting channel" being co-filed with this application. Accordingly, the user selects the one or more inventory spots and assigns the advertisements for the selected inventory spots. Subsequently, the splicer 116 performs splicing of the first compressed data stream with the second compressed data stream at the one or more inventory spots.

According to one or more embodiments of the invention, the user accesses an advertisement generator tool for generating the advertisements. The advertisement generator tool includes various computing resources, such as, hardware resources, software resources, multimedia data (e.g., audio data, picture data and/or the like) and/or the like and thereby, enables the user to generate the advertisements that need to be replaced with the advertisements of the first compressed data stream. In one embodiment, the advertisement generator tool is the advertisement generator disclosed in the provisional patent application titled "Method and apparatus for generating a multimedia advertisement" being co-filed with this application.

Additionally, the processing station 112 is configured to communicate with a plurality of devices, such as, a device 132*i*, a device 1322, a device 1323, and a device 132*n*, hereinafter referred to as the device 132, via the network 126.

The device 132 may be a desktop computer, a laptop, a mobile phone, a Personal Digital Assistant (PDA), a digital television, a set-top box and/or the like. The device 132 is adapted to process the modified compressed data stream of the processing station 112. In one embodiment, the device 132 may communicate an attribute of the user, such as an identification of the user and/or the like to the processing station 112. Subsequently, the processing station 112 may process the received compressed data stream in accordance the attribute of the user and thereby provide a conditional access to the user.

Figure 2:
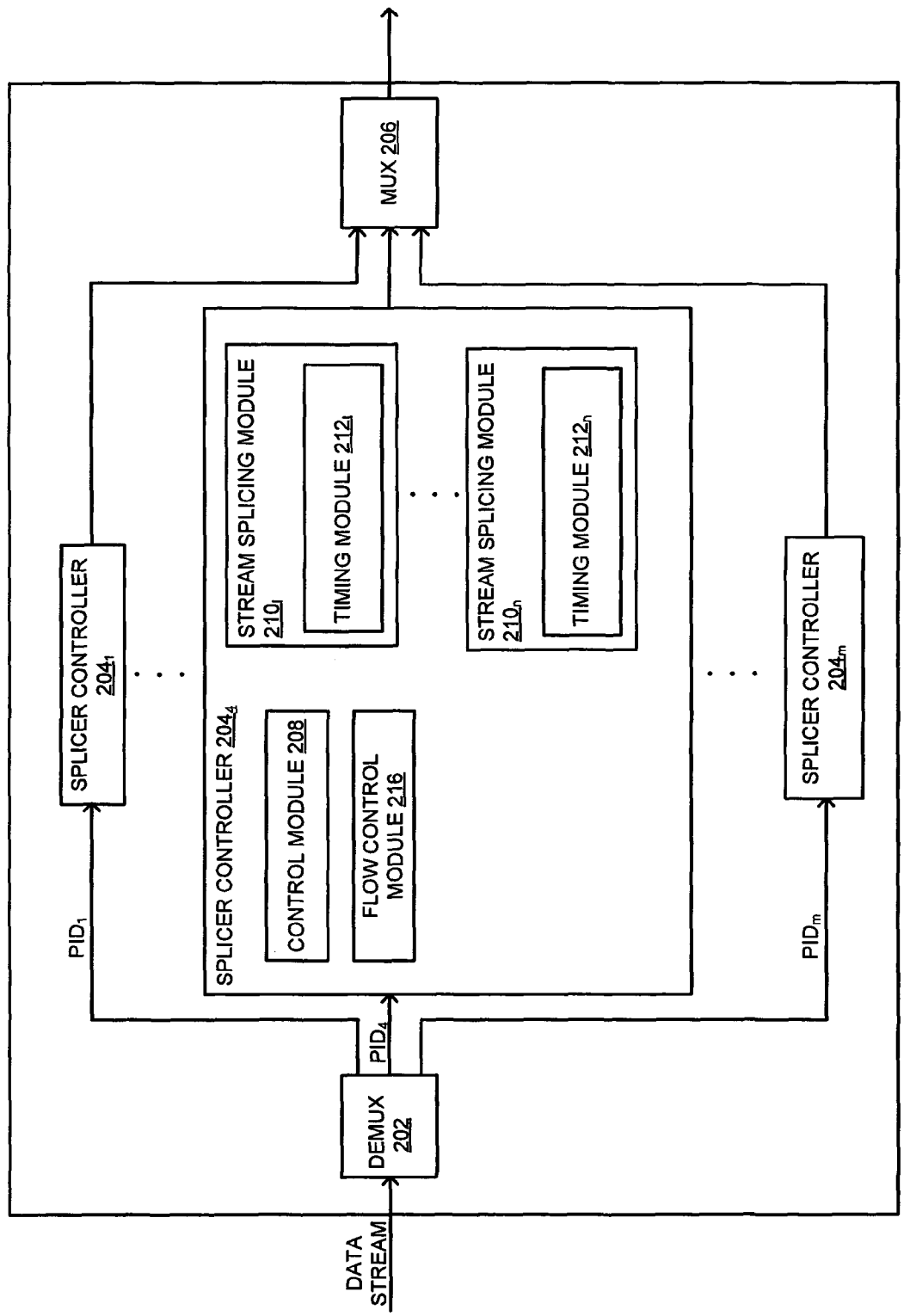
FIG. 2 illustrates a block diagram of an example embodiment of a splicer in accordance with one or more embodiments of the present invention.

FIG. 2 illustrates a block diagram of an example embodiment of the splicer 116 in accordance with one or more embodiments of the invention. The splicer 116 performs a splicing operation on the first compressed data stream and replaces the coded frames of the first compressed data stream with the one or more frames of the second compressed data stream. The splicer 116 includes a de-multiplexer (Demux) 202, a plurality of splicer controller, such as, a splicer controller 204i, a splicer controller 2042, a splicer controller 2043 and a splicer controller 204m, hereinafter referred to as the splicer controller 204 and a multiplexer 206.

Generally, the de-multiplexer 202 receives the MPTS from the receiver 114. The MPTS includes one or more SPTSs and each SPTS has a unique program identification number (PID). The de-multiplexer 202 de-multiplexes the received MPTS to one or more SPTSs and communicates the SPTS to the splicer controller 204. Each splicer controller 204 is configured to process the one or more streams (e.g., video, audio and PCR) associated with a particular SPTS. In one example, the splicer controller 204 performs the splicing operation on the associated streams of the SPTS and forwards the spliced SPTS to the multiplexer 206. The multiplexer 206 multiplexes the outputs of each splicer controller 204 and thereby, generates a processed MPTS. Accordingly, the multiplexer 2Q6 forwards the processed MPTS to the transmitter 118. In another example, the splicer controller 204 is configured to maintain synchronization among the video and audio streams of the SPTS. The first data stream may also be referred to as first compressed data stream.

According to one or more embodiments of the invention, the splicer controller 204 includes a control module 208, a flow control module 216, and a plurality of stream splicing module (SSM) 210, such as, a SSM 210i, a SSM 2102, a SSM 2103, and a SSM 210n, hereinafter referred to as the SSM 210. For example, a video SSM 210 performs a splicing operation on the video stream of the SPTS. An audio SSM 210 performs a splicing operation on the audio stream of the SPTS. A program clock reference (PCR) SSM 210 performs a splicing operation on a PCR stream of the SPTS.

The control module 208 monitors the one or more received data packets of the SPTS and thereby detect the splice in-point and the splice out-point within the SPTS. In one embodiment, the control module 208 may detect a signal, such as a CUE tone signal within the data packets and thereby, detect the splice in-point and the splice out-point within the SPTS.

Further, on detection of the splice in-point and the splice out-point, the control module 208 communicates the splice in-point, the splice out-point to the SSM 210. Subsequently, the SSM 210 detects an arrival of access unit boundaries (AUBs) within the streams of the SPTS. In addition, an access unit in the video stream of the SPTS is a picture frame and an access unit in the audio stream of the SPTS is an audio frame. The arrival of access unit indicates the presence of start of a picture header in the video stream and start of a new frame in audio stream. Further, the SSM 210 determines that whether a particular access unit is a splice opportunity point (SOP) or not.

The SOP is a location in the SPTS where the SSM 210 can initiate the splicing operation. In addition, the SOP refers to a particular access unit/frame in the SPTS and this particular access unit/frame does not have past and/or future dependency. Therefore, a SOP in the video stream of the SPTS is the I-frame. Similarly, a SOP in the audio stream of the SPTS is the audio frame. Also, a SOP in the PCR stream of the SPTS is the PCR packet.

According to various embodiments of the invention, the SSM 210 is configured to process the stream without de-packetization of the transport stream. In some embodiments, the SSM 210 monitors the data packets of the SPTS for the arrival of the AUB. The SSM 210 parses the headers information available in the data packets of the SPTS for locating the AUB.

In one embodiment, when the PES boundary and the ES boundary of the SPTS are aligned, then start of a PES header incorporates the start of the ES header. In addition, the alignment of PES boundary and the ES boundary can be at any level namely, sequence, GOP, picture and slice. Further, the TS data packet includes a pay unit load start indicator (PUSI) bit that indicates the start of new PES headers within the SPTS. The presence of PUSI bit in the TS data packet implies the presence of the ES header.

Furthermore, the SSM 210 is configured to detect the presence of picture header for locating the AUB in the TS data packet. In instances, when the stream (e.g., the video stream) have several header lined up across the multiple packets, the SSM 210 detects the presence of the AUB using multiple data packets of the transport stream. On arrival of the AUB, the SSM 210 identifies the presence of the SOP within the TS data packet. As an example and not as a limitation, the SSM 210 locates the presence of the SOP by checking for PUSI bit and subsequently looking for picture header within the TS data packet.

Further, the SSM 210 identifies a splice-in opportunity point corresponding to the splice in-point and a splice-out opportunity point corresponding to the splice out-point from a plurality of splice opportunity points (SOPs) within a particular stream (e.g., video stream, audio stream, PCR stream and/or the like) of the SPTS. The splice-in opportunity point refers to a frame in the particular stream of the SPTS and the SSM 210 initiates the splicing operation onwards to this particular frame. The splice-out opportunity point refers to another frame in the particular stream of the SPTS and the SSM 210 ends the splicing operation before another frame.

In addition, on detection of spice-in opportunity point in a particular data TS packet, the SSM 210 replaces the TS data packets of the particular data stream either with one or more data packets of the second compressed data stream or with dummy data packets. The SSM 210 replaces the TS data packets of the SPTS till the splice-out opportunity point.

In some embodiments, when TS data packets of a particular stream (e.g., audio stream) of the first compressed data stream include two or more frames, the SSM 210 monitors headers of the one or more the frames in order to identify the splice-in opportunity point and splice-out opportunity point. If a frame is declared as the splice-in opportunity point or splice-out opportunity point in a particular TS data packet, the SSM 210 modifies the particular TS data packet. If the particular data packet includes the splice-in opportunity point, then the SSM 210 modifies the particular data packet by preserving data only preceding the splice-in opportunity point. The remaining portion of the particular data packet is replaced with zeros in order to complete the size of the particular data packet (e.g., 188 bytes). If the particular TS data packet includes the splice-out opportunity point, the SSM 210 modifies the particular data packet by data only succeeding the splice-out opportunity point. The remaining portion of the particular TS data packet is replaced with zeros in order to complete the size of the particular data packet (e.g., 188 bytes). In one example, stuffing bytes 0xff are used after the transport stream header to fill the remaining portion of the TS data packet. Thus, the SSM 210 modifies or replaces data packets of the stream on the detection of splice-in opportunity point and splice-out opportunity point without de-packetization of the SPTS. Thus, a selective processing of the data packets of the first compressed data stream increases the efficiency of the system.

Further, the SSM 210 includes a plurality of timing module, such as a timing module 212*i*, a timing module 212₂, a timing module 212₃, and a timing module 212*n*, hereinafter referred to as the timing module 212. As explained later in the description, the timing module 212 modifies the timing values associated with the one or more frames of the second compressed data stream or the dummy frames in accordance with the timing values associated with the one or more frames of the first compressed data stream.

The flow control module 216 controls the flow of the data packets of the one or more streams of the first compressed data stream and will be discussed later in the description. The one or more embodiments of the splicer controller 204 and the modules, such as, the control module 208, SSM 210 and/or the like, may be implemented in hardware, software, or a combination of hardware and software.

Video Splicing

Figure 3A:
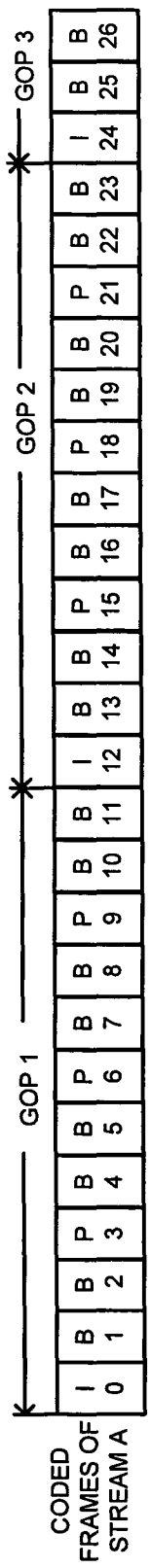
FIG. 3A-E illustrate an example splicing operation on a data stream in accordance with one or more embodiments of the present invention.

FIGS. 3A-3E illustrate an example splicing operation on an example coded video stream of the first compressed data stream in accordance with one or more embodiments of the invention. FIG. 3A illustrates a display sequence of the coded picture frames of the coded video stream A and each picture frame of the coded video stream A is encoded as per the compression technologies defined in MPEG-2 standard. Additionally, the corresponding numbers of the picture frames provides a temporal reference that corresponds to a display order of the frames of the video stream A. As illustrated, the frame 0 is coded as the I-frame and the frame 3 is coded as the P-frame. The frame 3 is dependent on the preceding frame 0 and requires frame 0, while decoding at the device 132. The frame 1 and frame 2 are bidirectional frames and thereby, frame 1 and frame 2 are dependent on the preceding frame 0 and the future frame 3.

FIG. 3A further illustrates the Group of Picture (GOP), such as GOP 1, GOP 2 and/or the like for the video stream A of the first compressed data stream. The GOP generally starts with the I-frame and is followed by the one or more P-frames and the B-frames. For example, the GOP 1 includes frame 0 to frame 1 and the GOP 2 includes frame 12 to frame 23 in the video stream A. As an example and not as a limitation, the size of the GOP for the video stream A is defined as twelve and those who are skilled in the art may use variable size for the GOP for the video stream.

Figure 3B:
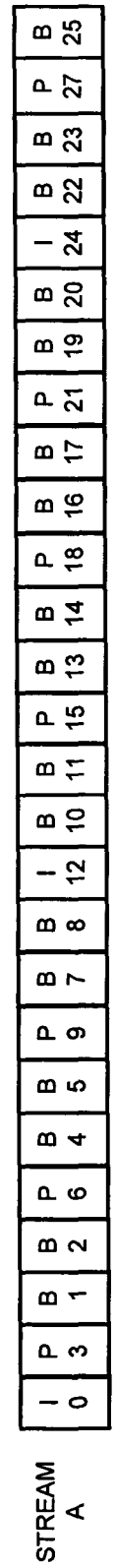

FIG. 3B illustrates the transmitted sequential view of the coded video stream A. As per MPEG-2 standards, transmission of coded video stream starts with the I-frame of the GOP and is followed by the sequence as shown in the FIG. 3B. The processing station 112 receives the video stream A in the first compressed data stream and the splicer 116 may replace one or more frames of the video stream A with the one or more frames of video stream B. The modified video stream A (as illustrated in the FIG. 3E) does not cannot include any frame from the original video stream A whose prediction reference is between the splice-in opportunity point and splice-out opportunity point number. As a result, there are no unresolved frame dependencies. Therefore, the splicing operation is started at the start of a GOP and frames are replaced only at the start of fresh sequence with I frame or P frame.

As an example and not as a limitation, when the GOP size of the video stream A matches with the GOP size of the video stream B, the video SSM 210 replaces one or more GOPs of the video stream A with one or more GOPs of the video stream B. Additionally and/or alternatively, when the GOP size of the video stream A and the video stream B mismatches, the video SSM 210 replaces one or more GOPs of the video stream A with one or more GOPs of the video stream B and with one or more filler frames.

Figure 3C:
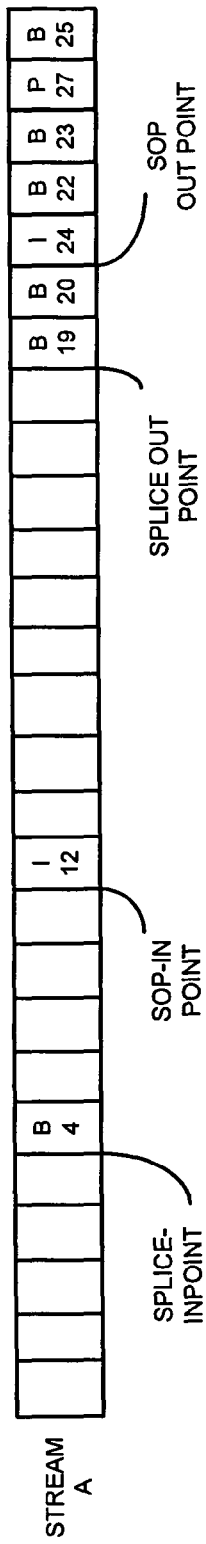

FIG. 3C illustrates the splice in-point, the splice out-point and one or more SOPs within the video stream A. The control module 208 identifies the frame 4 as the splice in-point and the frame 19 as the splice out-point. The video SSM 210 monitors the video stream A and further identifies the frame 12 as splice-in opportunity point and frame 24 as splice-out opportunity point. As shown in the FIG. 3C, the frame 12 is an I-frame and accordingly, the video SSM 210 replaces the frames of the video stream from frame 12 onwards with the one or more frames of the video stream B. In some embodiments, a P-type frame of the video stream A may be selected as a splice-in opportunity point by the video SSM 210.

Figure 3D:
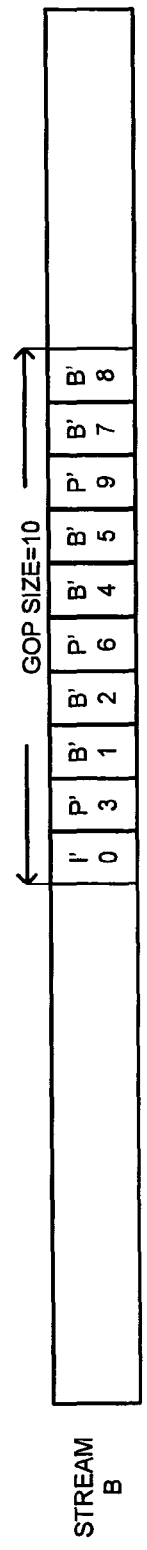
Figure 3E:
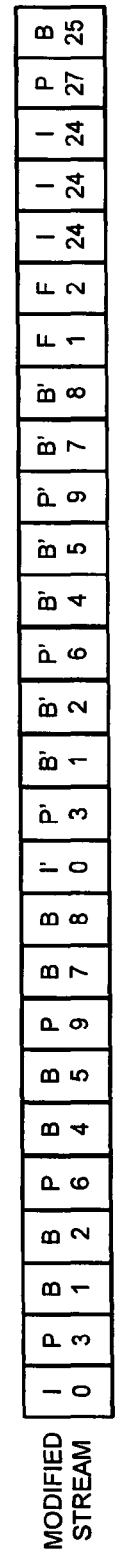

FIG. 3D illustrates the video stream B of the second compressed data stream. As shown in the FIG. 3D, the GOP size of the video stream B is equal to ten. FIG. 3E illustrates a modified stream that is generated after the splicing operation of the video stream A of the first compressed data stream. As an example and not as a limitation, the GOP size (GOP size=10) of the video stream B does not match with the GOP size (GOP size=12) of the video stream A. as a result, two filler frames F1 and F2 are additionally inserted within the video stream A of the first compressed data stream along with the GOP of the video stream B. The filler frames (e.g., F1 and F2) remove the mismatching of the GOPs sizes of the video stream A and video stream B. As explained later in the description, the filler frame may be an I-type filler frame and/or a P-type filler frame.

According to various embodiments, the SSM 210 prepares the video stream B in order to remove backward redundancy prior to the arrival of the splice-in opportunity point. In order to achieve efficient splicing operation, the video stream B must start with an I-type frame and the second frame of the video stream B can either be I-frame or P-frame. As shown in FIG. 3D, the video stream B starts with the I-frame and the next frame is a P-frame. If the video stream B does not includes this requirement, the video SSM 210 modifies the video stream B. The following changes are made within the video stream B. Frames prior to I frames in the video stream B are discarded. Further, frames between First I frame and next P frames of the video stream B are discarded. Finally, temporal references of the first I frame and the dummy frames are updated. In most cases, where video stream B is encoded as a file with finite duration, it is usually the case that above conditions of video stream B encoding is already met in which case no further processing of the video stream B is required. The SSM 210 caches the video stream B in order to pre-process and make the video stream B ready before the splice-in opportunity point arrives.

According to one or more embodiments, the video stream B is a finite video stream and the video SSM 210 determines any deficiency of frames that are required to replace the frames of the video stream A. In one example, the video SSM 210 determines the number of frames of the video stream B and the filler frames that replaces the frames of the video stream A succeeding the splice-in opportunity point. The video SSM 210 determines a sub_cjop_distance that is the difference between consecutive I frame and P frame temporal reference in a single GOP of the video stream. Practically, the value of the sub_jgop_distance is one more than the number of frames between the consecutive I frame and P frame.

Further, the video SSM 210 determines sub_temporal_reference=(temporal_reference) % Sub_jgop_distance, wherein (%) is a reminder operation. The value of sub_temporal_reference provides picture number between two consecutive 1-frame and P frames. For example, if a video stream A has a profile of an open GOP with 2B-frames, then in decode order, pattern of pictures is I B B P B B P with temporal reference 2 0 1 5 3 4 8 6 7 and so on. Thus, in this particular case, a value of the sub_gop_distance is 3, which is calculated either by subtracting temporal_reference of 2 consecutive 1-frame and P-frame or by adding 1 in number of B frame.

The video SSM 210 scans one AUB of video stream A and one AUB of the video stream B alternatively with video stream B lagging the video stream A by one sub_gop_distance of video stream B. It is assumed that the sub_gop_distance of the video stream A>=sub_jjop_distance of the video stream B and these sub_gop_distances are constant for a encoder setting.

The sub_temporal_reference of video stream B gives an estimate of number of frames of the video stream B and the filler frames need to put after the arrival of splice-out opportunity point of the video stream A. Once the splice-out opportunity point of the video stream A and an exit point of the video stream B is found, the video SSM 210 computes the number of valid frames (of the video stream B) and the number of filler frames that replace the frames of the video stream A during splicing operation. This can be calculated using the following algorithm.

When video stream B includes a closed GOP:

```
if (Current_picture_type == T) Number_of_frames of video stream B = 1
else
Number_of_frames of video stream B = sub_jgop_distance(B)
sub_temporal_reference(B)
```

When video stream B includes a Open GOP:

```
L = (subjgopJength(B) sub_temporal_reference(B))% sub_gop_length(B)
M = sub_gop_length(B) − 1, wherein M is equal to precise number of B
frames between two I/P frames
Number_of_B_frames = sub^gop_length(B) − (M + L) %sub.jjopJength(B)
```

In both of the above cases:

```
Number of filler frames = Sub__gop_distance − Number_of_B_Frames.
```

Further, during the splicing operation, at splice-in opportunity point or splice-out opportunity point, there are multiple frames in the video stream B or video stream A respectively that depend on the previous GOP. Thus, the video SSM 210 modifies the temporal reference of these frames in order to remove the dependency from the previous GOP. As an example and not as a limitation, the video SSM 210 modifies the temporal reference of 1-frame (i.e., the splice-out opportunity point) to 0 to make it a new GOP. In addition, temporal reference of next all filler/l-frame copies are monotonically increased (e.g., by 1) till the next forward frame arrives. The temporal reference of forward frame is not modified.

Referring again to FIG. 3C, after the splice-out opportunity point (frame 24), the frame 22 and the frame 23 are the frames of GOP 2. Since the splicer 116 does not decode the coded picture frames of the video stream A and the frame 22 and the frame 23 require decoding of the frames of the GOP 2, the video SSM 210 further replaces such frames with the l-frame (frame 24). Thus by replacing such B-frames (e.g., frame 22 and frame 23) with the copy of the I-frame, the splicer gets rid of the complex processing operation, such as a decoding operation of frames, a frame conversion operation, re-ordering the frame numbers and/or the like. Such replacement of B-frames by the SSM 210 reduces memory processing time and thereby increases the efficiency of the processing station 112.

Audio Splicing

According to one or more embodiments of the invention, the audio SSM 210 performs the splicing operation on the audio stream of the SPTS. Generally, in various compression standards, for example, MPEG, MPx and the like, a particular audio frame does not depend on the other audio frames. Therefore, the possible SOPs for the audio stream of the SPTS are the audio frames of the SPTS. On detection of the splice in-point and the splice out-point, the audio SSM 210 detects the splice-in opportunity point and splice-out opportunity point from the plurality of SOPs in the audio stream of the SPTS. Accordingly, the audio SSM 210 performs the splicing operation on the audio stream.

PCR Splicing

According to one or more embodiment of the invention, the PCR SSM 210 performs a splicing operation on the PCR stream of the SPTS. Generally, the SOP for the PCR stream is available at the arrival of the PCR packet of the PCR stream of the SPTS. During the splicing operation, the PCR SSM 210 modifies one or more PCR packets of the second compressed data stream in accordance with the PCR packets of the PCR stream of the SPTS. In one example, the PCR SSM 210 linearly modifies the PCR values of the PCR packets of the second compressed data stream in accordance with the PCR values of the PCR stream of the SPTS.

For example, if the PCR values of the last outputted PCR packet of the first compressed data stream is MP4, then the PCR values (e.g., AP1, AP2, . . . ) of the PCR packets of the second compressed data stream are modified. The modified PCR values of the second compressed stream are denoted as OP1, OP2 . . . and the like. In one example, the PCR values of the spliced point from the first compressed data stream is copied to second compressed data stream.

OP*i*=MP4

Further, for each consecutive new PCRs of the second compressed data stream, an offset is added. As a result, Nth PCR value of the second compressed data stream is modified as:

OP*n*=OP1+AP*n*-AP*i*

OP*n*=APH*t*(OP1-AP1)

Subsequently, the PCR SSM 210 replaces the PCR packets of the PCR stream of the SPTS with the modified PCR packets of the second compressed data stream.

According to various embodiment of the invention, the plurality of SSM 210 caches at least a portion of the second data stream before the splicing operation. In one example, the SSM 210 caches the second data stream completely before the splicing operation. Further the SSM 210 selects one access unit of the second data stream for replacing one access unit of the first data stream. The detection of the access unit is done using the same method as done for the first data stream and the method has been described earlier in the description. Further, advancement of each picture in the second data stream is done only once the corresponding number of pictures from first streams is advanced. This allows that data from second stream to be cached a prior. If second data stream is required to undergo any processing before the splicing operation, then the SSM 210 processes the second data stream before the start of the replacement of access units. For example, the second data stream is checked for compliance of standards or for desired duration mismatch. If there is any mismatch or no compliance, then the SSM 210 processes the second data stream during caching period.

Generation of Filler Frames

As explained earlier in the description, the SSM 210 replaces one or more frames of the first compressed data stream with the filler frames. For example, the video SSM 210 replaces one or more frames of the first compressed data stream with the video filler frames. In one embodiment, the video filler frame is an intra-coded filler frame or a predictive filler frame.

In one example, the P-type filler frame may be generated by making all the motion vectors and DCT coefficients within a P-type compressed frame. The p-type filler frame thus generated is predicted from a preceding frame without having motion compensation. Additionally and/or alternatively, a header of the P-type filler frame may not include a sequence header or GOP header information in order to reduce the number of bits for the P-type filler frame. The P-type filler frame is inserted only after the I-frame or the P-frame.

Similarly, the audio SSM 210 replaces one or more frames of the first compressed data stream with the audio filler frames. In one embodiment, the audio filler frames are silent frames that are generated by encoders using the appropriate profiles. As an example and not as a limitation, a frequency of 10 Hz is used for generating the audio filler frames.

In addition, the PCR SSM 210 replaces one or more frames of the first compressed data stream with the PCR filler frames. As the PCR frame includes clock information, therefore, the PCR filler frame is generated by modifying the PCR value of a last stored PCR packet of the first compressed data stream or the second compressed data stream. In one example, if the PCR value that was output by the splicer 114 is PCRJast and there is a need to generate and output next PCR packet within a duration of d millisec, then PCR value of the PCR filler frame calculated using PCRjiext=PCRJast+d*90. Accordingly, the PCR filler frame is generated.

PTS/DTS Modification

As described earlier in the description, the SSM 210 includes the timing module 212 that modifies the timing values such as, presentation time stamp (PTS), decoding time stamp (DTS) and the like, associated with the one or more frames of the second compressed data stream or the dummy frames in accordance with the timing values associated with the one or more frames of the first compressed data stream. As a result, the second compressed data stream achieves the same time base as that of the received compressed data stream.

In one example, the timing module 212 modifies the timing values by applying a linear transformation on the timing values of the second compressed data stream. As an example and not as limitation, If A is a vector representation of the PTS values in the second compressed data stream, B is a vector representation of the PTS values of the second compressed data stream, and S is a vector of constant shift value whose all elements are equal, the linear transformation A1=A+S represent a vector having modified PTS values and the linear transformation B1=B+S provides the modified DTS values of the second compressed data stream. The linear transformations thus applied on the second compressed data stream do not change clock reference characteristics. Additionally, to achieve smooth playing of the compressed data stream, the PCR SSM 210 modifies the PCR values of the second compressed data stream. For example, if P represents as a vector of the PCR values of the second compressed data stream, the linear transformation P"=P+S represents a vector having modified PCR values.

As an example and not as a limitation, a similar time base between the first compressed data stream and the second compressed data stream is achieved by determining a base point. The parameters, such as, base.pts, base.dts, display_order and decode_order are used to calculate the base point. The base point refers to a start point or any point where the PTS wraps around or temporal reference restarts (e.g., start of GOP in video).

An estimated PTS~(i) for any frame is calculated as: current.pts=base.pts+(current.display_order-base.display_order)*frame_size;

Based on this particular equation, frames of the second compressed data stream are modified to achieve time base of the first compressed data stream.

As an example and not as a limitation, for the video stream of the second compressed data stream (AF), AF_base.pts=PTS of the first picture of the start point of the first compressed data stream and AF_base.display_order=0. This value is valid in various cases. For example, in case of an open GOP of the second compressed data stream, the video SSM 210 pre-processes the second compressed data stream and removes the temporal dependency by modifying temporal reference of I-frame and replaces dependent pictures by dummy frames. Further, for the PCR stream and the audio stream arrival of every PTS and PCR value is a base point. Therefore, the base point is updated for each and every PTS and PCR value.

Thus, using these values and the aforementioned equation, modified time stamps for the second compressed data stream are achieved.

According to the various embodiment of the invention, the timing module 212 may support a time-base discontinuity at the splice-in point. Accordingly, the second compressed data stream may start with a new time-base values. For example, the PTS values, the DTS values and the PCR values of the second compressed data stream may have the new time-base. The new time base values may be indicated by setting the discontinuity indicator of the first packet of the second compressed data stream having new time base. Accordingly, at the splice out-point the discontinuity indicator is set in the first packet of the first compressed data stream and thereby signaling a new-time base.

Figure 4:
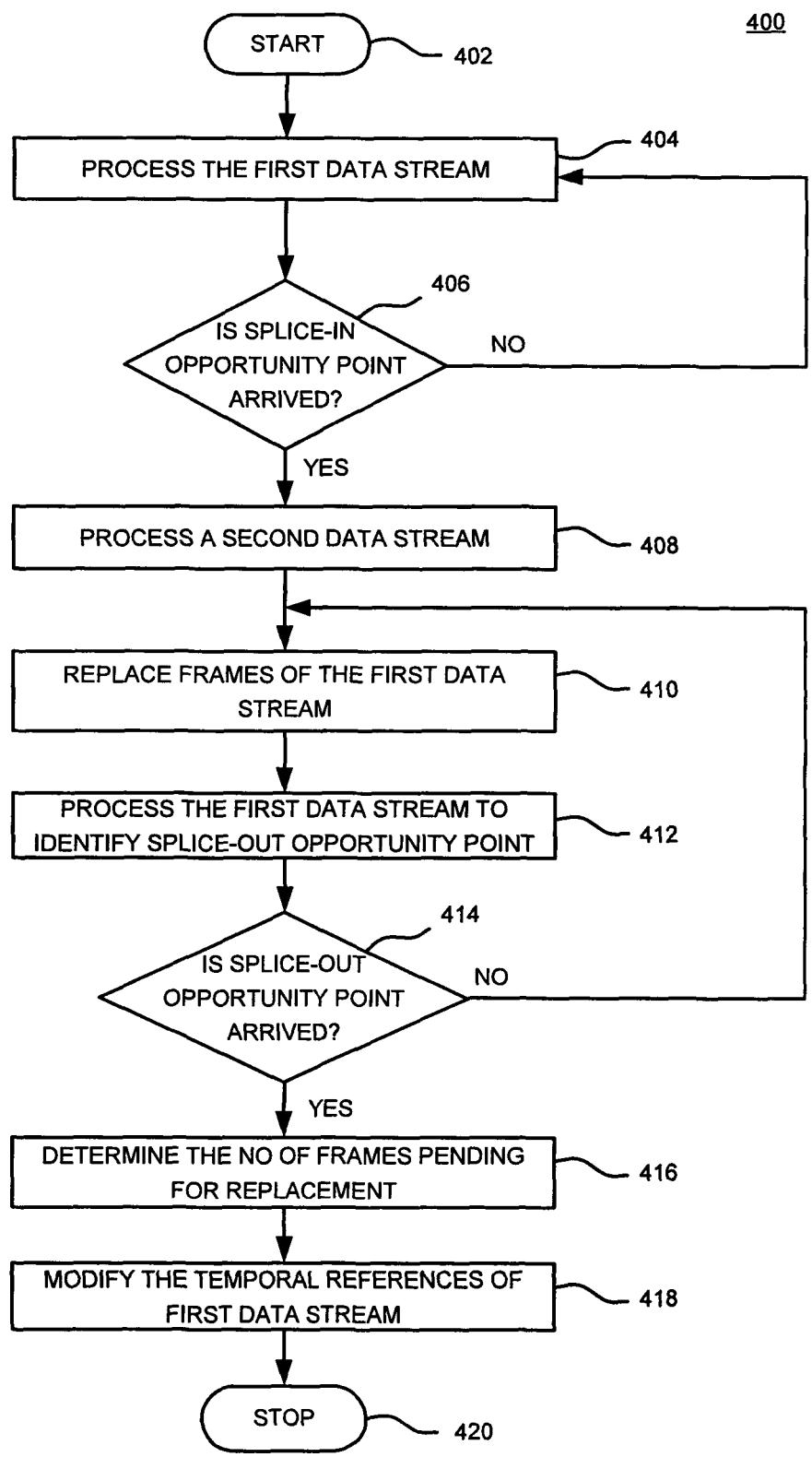
FIG. 4 illustrates a flow diagram of an example method for splicing operation on a data stream in accordance with one or more embodiments of the invention.

FIG. 4 illustrates a flow diagram of an example method 400 for splicing operation on a data stream in accordance with one or more embodiments of the invention. The method 400 starts at step 402 and proceeds to step 404. At step 404, a first data stream (e.g., a compressed data stream generated by a source station 102 of the FIG. 1) is processed. In some embodiments, the first data stream is monitored to detect the plurality of splice opportunity points in the video or audio or program clock reference stream.

The method 400 proceeds to step 406. At step 406, a decision is made as to whether a splice-in opportunity point is arrived. If the splice-in opportunity point is not arrived, then the method 400 proceeds to the step 404. If the splice-in opportunity point is arrived, the method 400 proceeds to step 408. At step 408, a second data stream is processed. In one embodiment, a stream splicing module (e.g., a SSM 210 of the FIG. 2) modifies the temporal references of the frames of the second data stream.

At step 410, frames of the first data stream are replaced. In some embodiments, a video stream splicing module (e.g., a video SSM 210 of the FIG. 2) performs GOP level accurate splicing and replaces one or more GOP of the video stream of the first data stream with the one or more GOP of the second data stream. In some embodiments, an audio splicing module (e.g., an audio SSM 210 of the FIG. 2) performs a frame level accurate splicing on the audio stream of the first data stream.

At step 412, the first data stream is processed to identify the splice-out opportunity point. At step 414, a decision is made as to whether the splice-out opportunity point is arrived. If the splice-out opportunity point is not arrived, the method 400 proceeds to the step 410. If the splice-out opportunity point is arrived, the method 400 proceeds to step 416. At step 416, number of frames that are pending for the replacements is determined. In one embodiment, the stream splicing module (e.g., the SSM 210 of the FIG. 2) determines the number of frames of the first data stream that needs to be replaced. Further, the stream splicing module identifies the number of frames of the second data stream and the number of filler frames that are used for replacement of the first data stream.

At step 418, temporal references of the frames of first data stream may are modified. The method 400 proceeds to step 420. At step 420, the method 400 ends.

Various embodiments of the invention discussed herein offer several advantages. In one example, the invention achieves a GOP accurate splicing for video streams and a frame accurate splicing is achieved for audio streams of the first data stream. Further, the splicing operation is independent of the size of the GOP. The first data stream and the second data stream can have arbitrary GOP size. The splicing operation replaces one access unit with the other access unit. Further, the time base corrections are provided for the second data stream in order to avoid any discontinuity in the time base in the spliced stream. In addition, dummy frames are provided at an exit of the splicing operation to provide a smooth transition effect.

Further, the splicing operation does not decode the coded frames of the compressed data stream. Due to absence of decoding of frames, the invention works efficiently with a relatively lesser processing requirements without affecting the quality of the splicing operation. The splicing operation does not require reordering of the picture frames of the first data stream, as the splicing operation does not depend on the future pictures. Thus, order of arrival of each picture at the splicer is identical to the order at which the pictures leave the splicer.

Furthermore, the splicing operation does not require storing the frames for later use in the splicing. A decision on whether the frame will be selected or dropped in the spliced stream is made on the arrival of frame. Finally, the splicing operation does not de-packetize the transport stream to perform a splicing operation. Due to absence of de-packetization and re-packetization of the transport packets, huge overhead of memory copying is avoided. As a result, the splicing operation is achieved with high speed and a relatively higher quality.

Flow Control:

According to one or more embodiments of the invention, the flow control module 216 controls the advancement of the plurality of streams of the first data stream within the processing station 112. Generally, the plurality of streams of the first data stream is available at different data rates and in addition, the data rates are variable across the time. In other words, different data rates exist at different intervals of the time. As a result, the plurality of SSM 210 can process different amount of data during a time period.

In addition, the plurality of streams leads or lags among each other. For example, a particular audio stream of the first data stream may lags with respect to a video stream of the first data stream. Therefore, the flow control module 216 is configured to ensure that the plurality of SSM 210 processes the streams in a way so that the plurality of streams maintains a permissible lag or lead. As an example and not as a limitation, the plurality of SSM 210 processes an equal amount of data during a particular time period in order to maintain the permissible lead or lag.

In one or more embodiments, the plurality of SSM 210 processes the corresponding streams for a leap period. The leap period is equal to an amount of duration a particular stream splicing module processes a particular stream. The leap period is equal to play duration of one or multiple numbers of the access units of the stream. For example, for the video stream, the leap period is equal to the play duration of one or multiple numbers of the video access units. In addition, for a particular leap, the leap period varies across the plurality of SSM 210. For example, the leap period of the video SSM 210 may be different from a leap period of the audio SSM 210.

In order to achieve the flow control among the plurality of streams, the plurality of the SSM 210 processes the corresponding streams on a leap by leap basis. That is to say, a particular stream splicing module of the SSM 210 moves to next leap only when remaining stream splicing modules of the SSM 210 completes the corresponding leaps. In a particular instance, when the plurality of SSM 210 does not communicate with each other, the flow control module 216 is configured to communicate information to the plurality of SSM 210 that each SSM 210 has completed the leap. In addition, the flow control module 216 communicates a common leap credit to the plurality of the SSM 210 at the start of the leap.

Further, each stream splicing module of the plurality of SSM 210 processes the access units of the corresponding stream. With arrival of each access unit of a particular stream, the leap credit of the corresponding stream splicing module is reduced by an amount equal to play duration of the access unit. Further, when the leap credit of the stream splicing module is less than the play duration of the access unit, the stream splicing module of the particular stream finishes the leap and communicates the status of leap end to the flow control module 216. Further, on receiving the leap end status from the remaining stream splicing modules of the SSM 210, the flow control module 216 provides information to the plurality of SSM 210 to start the new leap. In this way, on completion of a leap cycle that includes multiple number of leaps, a permissible lead or lag is maintained. In one example, on completion of the leap cycle, lead or lag present at the start of the leap cycle is maintained among the plurality of streams of the first data stream.

In one example, the duration of the leap cycle is equal to a least common multiple (LCM) of the access unit intervals of the plurality of streams of the first data stream, in addition, a pseudo code is provided to achieve the flow control among the plurality of streams in accordance with one or more embodiments of the invention.

```
// At flow control module 216.
Number of SSM 210= N;
Set Average_leap_size to all splicers FoM = O,... , N
{ If (! Leap_finished(i) )
{ Run_stream_splicing_module ( ) lf(leap_finish(i))
Leap_count++; }
If (leap count = N)
Reset leap_finish(i) for all i,... N issue new leap for all i,....N
// Inside stream splicing module Run_stream_splcing_module
( ) { If (new leap)
leap_credit += avgjeap; while (leap_credit >=
```

```
Access_unit_duration) { spliceO // till
next Access unit leap_credit -= Access_unit_size;
If(leap_credit < Access_unit_size)
leap_finished(i) = TRUE;}
```

Figure 5:
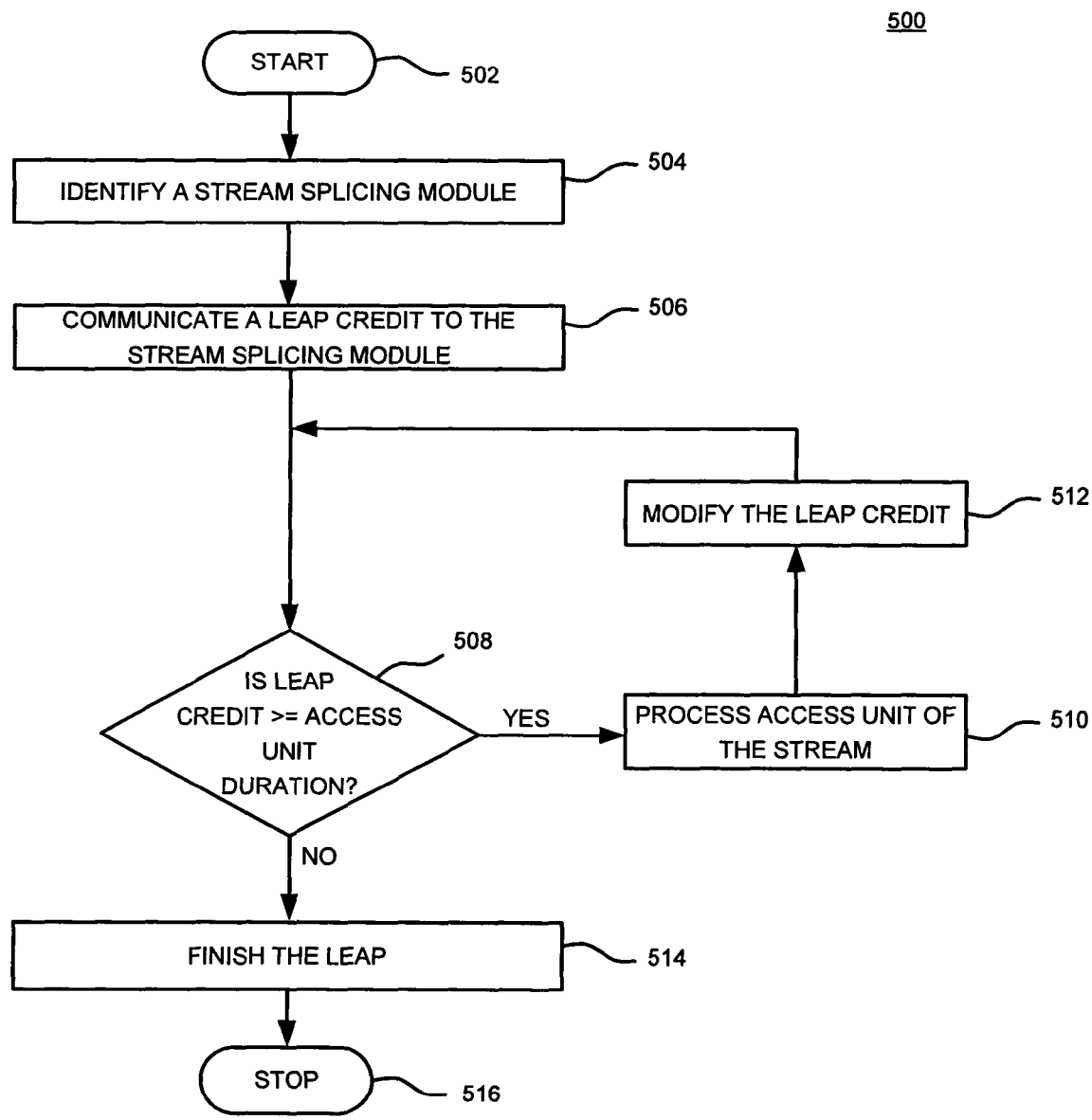
FIG. 5 illustrates a flow diagram of a method for controlling the flow of a plurality of streams of a first data stream in accordance with one or more embodiments of the invention.

FIG. 5 illustrates an example flow diagram of a method 500 for controlling the flow among a plurality of streams of a first data stream in accordance with one or more embodiments of the invention. The method 500 starts at step 502 and proceeds to step 504. At step 504, a stream splicing module (SSM 210) (e.g., a SSM 210 of the FIG. 2) is identified. At step 506, a leap credit is communicated to the stream splicing module. In one embodiment, a flow control module (e.g., a flow control module 216 of the FIG. 2) communicates a leap credit to the stream splicing module. The method proceeds to step 508. At step 508 a decision is made as to whether the leap credit is greater than or equal to duration of an access unit. If it is determined that the leap credit is greater than or equal to duration of an access unit, the method 500 proceeds to step 510. At step 510, the access unit of the stream is processed. For example, a video stream splicing module processes the video access unit of the video stream. In some embodiments, the video stream splicing module replaces the video access unit with another video access unit. In one example, the replaced access unit is a video access unit of a video stream of a second data stream. In another example, the replaced access unit is a dummy access unit.

At step 512, the leap credit is modified. In one example, the leap credit is reduced by an amount equal to the duration of the access unit of the stream. The method further proceeds to step 508. If it is determined that the leap credit is not greater than or equal to duration of an access unit, the method 500 proceeds to step 514. At step 514, the leap is finished. The method 500 proceeds to 516. At step, the method 500 ends According to one or more embodiments of the invention, the flow control is independent of a media type, codec type or a file format type. Further, the flow control module 216 enable the stream splicing modules to process an equal amount of data. As a result, the flow control does not require bit rate information of the plurality of streams of the first data stream. Therefore, the flow control can work with the arbitrary bit rates or a variable bit rates of the plurality of stream. In addition, the flow control algorithm manages the initial lead or lag among the plurality of stream. As a result, a suitable splice opportunity point, during multi stream SOP grant, is located. Also, the access units of the first data stream and second data stream are processed alternatively. Thus, the flow control of first data stream controls the flow of second data stream. Further, the flow control does not require decoding or complex bit rate calculations of the streams in order to control the data. Furthermore, as the TS/PES header includes time related fields, the flow control requires only TES/PES headers for the operation.

Multiple Streams SOP Grant Algorithm

According to one or more embodiments of the invention, the control module 208 is configured to identify splice-in opportunity point and splice-out opportunity point of one stream corresponding to a splice-in opportunity point and splice-out opportunity point of the other stream of the first data stream. A selection of splice opportunity points of one stream in accordance with the splice opportunity points of the other stream improves the quality of the spliced stream. For example, such process of selection of splice opportunity points (SOPs) maintains the pre-established synchronization among the plurality of streams (e.g., a video stream and one or more audio streams) of the first data stream. In another example, such process of selection of splice opportunity points avoid the generation of difference in an exact replaced duration of different streams. As a result, a discontinuity of time base due to the mismatching of duration between PCR and other content can be prevented.

In addition, the control module 208 identifies an anchor stream among the plurality of streams of the first data stream. In one embodiment, the anchor stream includes access units that have largest play duration among the access units of the other streams of the first data stream. As an example and not as a limitation, the control module 208 may identify the video stream as the anchor stream, as play duration of the access unit of the video stream is relatively larger than the play duration of the access units of the one or more audio stream. In another embodiment, the control module 208 identifies an audio stream as the anchor stream.

As described earlier in the description, the splice opportunity points arrive at different points for different streams. For example, for the audio stream, the splice opportunity point arrive at an access unit boundary (AUB), whereas, the splice opportunity point for the video stream arrive at every GOP. After detection of the anchor stream, a splice opportunity point (e.g., splice-in opportunity point or splice-out opportunity point) is determined in the anchor stream.

Further, a variable $e\hat{} = |SOPanchor(i)-SOPnO)|$ is calculated for a plurality of splice opportunity points of nth stream for a determined splice opportunity point of the anchor stream. The variable ey calculates the difference between the presentation time stamp (PTS) value of im splice opportunity point of the anchor stream and jth splice opportunity point of the n"1 stream. The nm stream splicing module indentifies a particular splice opportunity point in the n"1 stream, wherein the variable ey has lowest value for the particular splice opportunity point.

According to one or more embodiments, various approaches are used for efficiently determining the splice opportunity points for the plurality of streams of the data stream. In one approach, the splice opportunity points of the plurality of streams are predicted before the arrival of the SOPs. Accordingly, the variable is calculated and the SOPs of the plurality of streams are determined in accordance with the SOPs of the anchor stream. This approach is also referred to as predictive approach of SOP selection. In an iterative approach, the control module 208 holds the processing of streams suspended till the arrival of the SOP. Further, an iterative algorithm (described later in the description) identifies whether the arrived SOPs is an optimal SOP set or not. Accordingly, control module 208 communicates the corresponding stream for further processing. In another approach, a combination of predictive and iterative approach is used.

The following description provides one or more algorithms for implementing the predictive, iterative and combined predictive & iterative approaches. The variable names and the corresponding definition are as follows:

SOP_flag: arrival of an SOP indicated by stream splicing module engine.
SOP_granted: set when SOP of a stream is granted.
SOPJimestampn (i): ith SOP instance of nth stream.
SOP_timestamp~n 0): im Predicted SOP instance of n*1 stream.
Anchor stream: Prediction is done on the basis of this stream.
sop_count=Count of channel on which SOP is granted
ey=PTS error between ith SOP of anchor stream and jm SOP of other stream
S is the target SOP timestamps given to stream splicing module.

```
PEDICTIVE ALGORITHM
SOP_timestamp~o (0) = Predict (Null)
SOP_PTSo =SOP_timestamp~o (0) For n <-
O1N SOP_timestamp~n (0) = Predict(SOP_PTS0) sop_count = 0
/* Run stream splicing module */ while (sop_count < N)
{ for (n <- O1N)
{ Run_ stream_splicing_module (n); if(SOP_PTSn <=
CURRENT-PTSn) && SOP_flag
== TRUE)
{ SOP_granted(n) sop_count++ }
} } ITERATIVE ALGORITHM
sop_count = 0
/* Run stream splicing module */ while (sop_count < N)
{ for (n <- 0,N) { Run_splicer
(n);
If (SOP_flag == TRUE && n == anchor stream)
{ SOP_granted(n) sop_count++; } if
(SOP_flag == TRUE && n != anchor stream &&
SOPj3ranted(anchor stream) == TRUE) { calculate
(eij) calculate (eió+1)) if (eij <=
eiG+1)) { SOP_granted(n) sop_count++; } else continue; } } }
```

Combined Predictive and Iterative Algorithm

In this algorithm, the plurality of streams are sorted in order of average SOP duration. In the next step, the anchor stream is selected among the plurality of streams. Further, an earliest SOP is predicted in the anchor stream. On detection of SOP in the anchor stream, multiple SOPs of other stream nearer to SOP of the anchor stream are predicted. Out of the multiple SOPs of other stream, splice-in opportunity point and splice-out opportunity point for the other stream are selected in accordance with the variable ey. Also, this algorithm checks that no stream crosses the farthest SOP using the following conditions: Following condition is a must to ensure that no stream will cross the farthest SOP stream:
a. Lead of PTS[O] (at the start of every leap)>Lead PTS [i]+SOP_distance_max b. Where SOP_distance_max=worst case SOP duration of anchor stream.
In addition, a normal flow control, as described earlier, is started and arrival of every access unit boundary and the SOP for the streams are intimated. Further, the SOP prediction is re-iterated under following condition:
I. If the SOP of the anchor stream is NOT found at its original location, OR
II. If the SOP of anchor stream is found earlier than its expected locations.

The following pseudo code is provided to achieve the combined predictive and iterative algorithm.

```
sop_count = 0
/* Predict with a immediate PTS value*/
/* SOP_TIME_OUT. After this, abort the SOP search.*/
SOP_TIMESTAMP~O (0) = Predict (0) //
This implies next immediate SOP
SOP-PTS0 =SOP_timestamp~o (0)
For n <- O1N
SOP_timestamp~n (0) = Predict(SOP_PTS0) while
(sop_count < N) { for (n <- 0,N) {
Run_stream_ splicing module (n); If(current_PTS0> SOP"jTIME_OUT)
{ ExitO; }
If (SOP_flag == TRUE && n == anchor stream)
{ SOP_granted(anchor stream) sop_count++;
SOP_PTSo = Current_PTS0 For k <- O1N SOP_timestamp~n(0)=
Predict(SOP_PTS0) }
If (SOPJIag == TRUE && n != anchor stream &&
SOPjgranted(anchor stream ) ==
TRUE && Current_PTSn >= SOP_timestamp~n(0))
{
SOP_granted(n) sop_count++; } } }
```

According to one or more embodiments, prediction for SOP duration for fixed and variable GOP of the video stream is disclosed. Assuming S as an theoretical PTS at which the SOP should arrive in the video stream. As already stated in the description, the video stream splicing module performs a GOP accurate splicing. Due to GOP accuracy and having no control over position of GOP start, SOP_timestamp~n (i) is searched within a range. In an example, where size of the GOP of the video stream is fixed and is "GOP-SIZE", the neighboring SOPs of S are:

totaLaubs=(S-current_pts).AUB_SIZE/(90*1000)
covered_GOP_distance=GOP-SIZE-total_aubs % GOP_SIZE SOP_timestamp~n(i)=(total_aubs−covered_GOP_distance)*AUB_SIZE SOP_timestamp~n (i+1)=SOP_timestamp~n
(i)+GOP_SIZE*AUB_SIZE Further, depending upon the covered_GOP_distance, either SOPtimestamp~n (i) or SOPtimestamp~n (i+1) is selected from minimum e1 and e2 as:

e1=(S-SOPtimestamp~n (i))
e2=(SOP_timestamp~n (i+1)−S)

Predicted best SOP is the one that corresponds to minimum error between e1 or e2. This algorithm holds equally for the audio stream too.

Optimal Grant Algorithm

According to one or more embodiments of the invention, the program insertion or the advertisement insertion over writes the specified content of first stream with the contents of the second stream. Generally, an event occurs in which a content clip on the first data stream is targeted to be over written. The splice-in point provided is the start of the content (e.g., frame) in first such events and splice-out point is defined as the last frame of the event. When the stream splicing module does not perform a frame accurate splicing on the stream, the effective splice-in point and splice-out point differs. As a result, either previous frames in the first data stream are over overwritten (resulting in loss of those pictures in output), or few frames from the targeted event will be revealed producing a perceptual glitch.

Thus, the optimal SOP grant algorithm identifies an optimal SOP set (splice-in opportunity point and splice-out opportunity point) that optimizes between the past event overwritten and the current visible elements in the output.

In one embodiment, the algorithm comprises the following steps.

Assuming "S" as the theoretical splice in-point and the expected event transition is happened at S in the first data stream. In order to identify a perceptually optimal SOP, the SOP for the anchor stream is determined. Accordingly, SOP for the other streams are determined using the aforementioned algorithms (e.g., predictive, iterative and combined predictive & iterative).

Further, closest SOP to "S" which are SOP0O) and SOP0 (H-I) are predicted or identified in a particular stream. In addition, errors eo(i) and eo(i+1) corresponding to error in the SOP are defined, wherein errors eo(i) and eo(i+1) are calculated as:

$eo(i) = S - SOPo(i)$ $e0(i+1) = S - SOPo(i+1)$

In the next step, a pair SOP0O) and SOP0(i+1) is located such that eo(i) is the minimum −ve error and eo(i+1) is minimum +ve error. On arrival of the SOPo(i), a decision is made as to whether grant the current SOP or drop the current SOP.

Also, SOP~0(i+1) is predicted and the values of eo(i) & e~0(i+1) are available.

Further the following decision is done in the algorithm.
If eo(i) and eo(i+1) are both negative, the algorithm continues to search for next SOP i,i+1 pair,
If eo(i) is −ve and eo(i+1) is +ve, SOP is selected from this pair, Optimal SOP=SOP0(i) if |eo(i)|>|e~0+(i+1)|
Optimal SOP=SOP~0(i+1) if |eo(i)|>|e~0(i+1)| Find all SOPn using the multiple stream SOP grant algorithm. If βo(i) and eo(i+1) are both positive, abandon the algorithm.

As disclosed, once the predicted SOP is selected, the current optimal SOP grant algorithm exits and multiple stream SOP algorithm calculates all SOPs of the other streams. In case of variable GOP, sequence number of SOPs is not predictable. As a result, i is an arbitrary number. In this case this algorithm is attempted at every arrival of SOP. In this particular case, the following condition is used to decide optimal SOP. SOP~0(i+1)=SOPo(i)+MIN_GOP_SIZE
Further, if the SOP0(i) is not granted and SOP~0(i+1)>SOP_TIME_OUT, the splicing operation is aborted.

Weighted Predicted SOP

According to one or more embodiments, overwriting of previous events is relatively more sensitive. In this case, the error pair is weighed to achieve a relative more optimize selection of the SOP.

Further, two weights w− and w+ are given to stream splicing module for perceptual decision making. In one example, the weights w− and w+ are linear function of i. in another example, the weights w− and w+ are non-linear functions of i. In this case, the minimum error SOP is calculated as:

Optimal SOP=SOP0($J$) if $|eo(i)|*w->|e~0(i+1)|*w+$

Optimal SOP=SOP~0($i$+1) if $|eo(i)|*w->|e~0(i+1)|*w+$

For example, if w− and w+ are 4 and 1; which means error produced in backward direction is more costly than in forward direction. So an SOP just 2 picture before the S has same impact as of SOP after 8 picture from the S.

Figure 6:
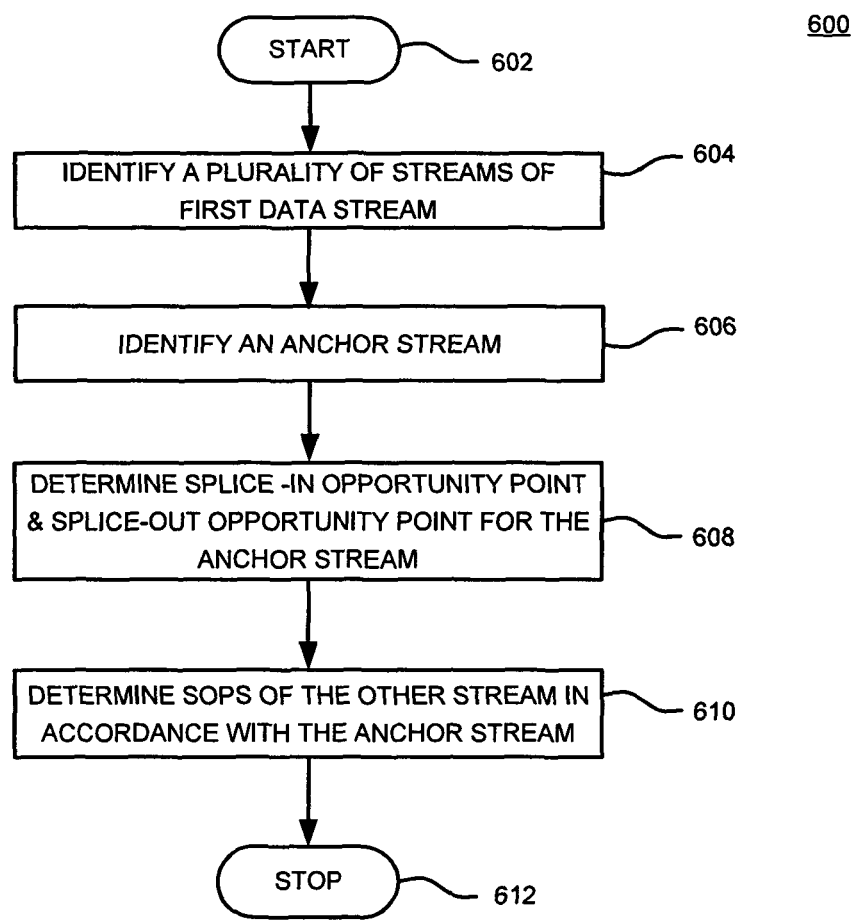
FIG. 6 illustrates a flow diagram of a method for selecting splice opportunity points of the plurality of streams of the first data stream in accordance with one or more embodiments of the invention.

FIG. 6 illustrates a flow diagram of a method 600 for selecting splice opportunity points of the plurality of streams of the first data stream in accordance with one or more embodiments of the invention. The method 600 starts at step 602 and proceeds to step 604. At step 604, a plurality of streams of the first data stream is identified. In one example, the plurality of streams includes a video stream, one or more audio streams and a PCR stream.

At step 606, an anchor stream among the plurality of streams is identified. In some embodiments, the anchor stream has the highest SOP duration among the other streams of the first data stream. At step 608, splice-in opportunity point and splice-out opportunity point for the anchor stream are determined. At step 610, the SOPs of the other stream are determined in accordance with the splice-in opportunity point and splice-out opportunity point of the anchor stream. In one example, a multiple stream grant algorithm is used to determine SOPs of the other stream.

The method 600 proceeds to step 612. At step 612, the method 600 ends.

According to various embodiments of the invention, the SOP grant algorithm is independent of a media type, codec type or a file format type. Further, the SOP grant algorithm does not require bit rate information of the plurality of streams of the first data stream. Therefore, the SOP grant algorithm can work with the arbitrary bit rates or a variable bit rates of the plurality of stream. In addition, the SOP grant algorithm works with the first data stream that includes one or more video streams, one or more audio streams with a high efficiency for a given accuracy of a splicing.

Further the SOP grant algorithm works with an arbitrary accuracy capability of the stream splicing modules. For example, SOP grant algorithm works when splicing is a frame accurate splicing or a GOP accurate splicing or a sub-gop accurate splicing. The SOP grant algorithm process one access unit only once. That is to say, the SOP grant algorithm does not need future or past storage for making decisions. Furthermore, the SOP grant algorithm works efficiently with variable SOP durations (advertisers, broadcasters and the viewers, and such a method of doing business is disclosed in provisional patent application "Method and system for broadcasting multimedia data" being co-filed with this application. According to the various embodiments as discussed, the splicer and provides several advantages to such a business method, especially in allowing advertisers and/or broadcasters to insert advertisements streams acquired, for example, at a local cable head end instead of the broadcasted stream. e.g., variable GOP size). In addition, as the SOP grant algorithm does not require parsing and processing of the stream (except determination of SOP), this algorithm requires relative lesser computations.

Further, various embodiments discussed herein enable a method of doing business, wherein advertisements may inserted into a broadcast stream such that the inserted advertisements are shown in relatively smaller geographical area, e.g. an area pertaining to a cable head end. The inserted advertisements may be different than the broadcasted advertisements. This has various advantages for advertisers, broadcasters and the viewers, and such a method of doing business is disclosed in provisional patent application "Method and system for broadcasting multimedia data" being co-filed with this application. According to the various embodiments as discussed, the splicer and provides several advantages to such a business method, especially in allowing advertisers and/or broadcasters to insert advertisements streams acquired, for example, at a local cable head end instead of the broadcasted stream.

While the foregoing is directed to embodiments of the present invention, other and further embodiments of the invention may be devised without departing from the basic scope thereof.

What is claimed is:
1. A method for controlling flow of a plurality of streams of a first data stream, each of the plurality of streams comprising a plurality of access units, the method comprising:
    providing a leap credit to a plurality of stream splicing modules to establish a leap period, wherein each of the plurality of stream splicing modules processes a corresponding stream of the plurality of streams, and wherein the leap credit is equal to a play duration of one or more access units of a stream from the plurality of streams;
    processing an access unit of each of the plurality of streams by the corresponding plurality of stream splicing modules;
    reducing the leap credit of each of the plurality of stream splicing modules by an amount equal to the play duration of the corresponding access unit of the corresponding plurality of streams; and
    discontinuing processing by the stream splicing module for which the leap credit is lower than the play duration of an access unit of the stream being processed by the stream splicing module.

2. The method of claim 1, wherein the processing comprises replacing one or more access units of the a plurality of streams of the first data stream with the one or more access units of a second data stream.

3. The method of claim 1, wherein the processing comprises replacing one or more access units of the a plurality of streams of the first data stream with filler frames.

4. The method of claim 1, wherein the providing a leap credit to the plurality of stream splicing modules at the start of the leap comprises communicating an equal leap credit to the a plurality of stream splicing modules at the start of a new leap.

5. The method of claim 1 further comprising maintaining an initial lead across the a plurality of streams after a determined amount of time.

6. The method of claim 5, wherein the determined amount of time is equal to duration of a leap cycle, wherein the leap cycle includes at least one leap.

7. The method of claim 6, wherein the duration of leap cycle is equal to the least common multiple (LCM) of the access unit interval of the a plurality of streams of the first data stream.

8. An apparatus for controlling flow of a plurality of streams of a first data stream comprises:
at least two stream splicing modules, each configured to process at least one access unit of corresponding each of at least two streams of the first data stream during a leap period, wherein the at least two stream includes a plurality of access units; and
a flow control module configured to provide a leap credit to the at least two splicing modules at the start of a leap and to ensure that the at least two stream splicing modules initiates the processing operation at the start of the leap, wherein the leap credit establishes the leap period for the at least two stream splicing modules, and wherein the flow control module is configured to reduce the leap credit of each of the at least two stream splicing modules by an amount equal to the play duration of the access unit of each of the corresponding at least two streams, and wherein each of the stream splicing module is configured to stop processing the corresponding each of the at least two streams if the credit leap is lower than the play duration of an access unit corresponding to the particular stream.

9. The apparatus of claim 8, where in the access unit is at least one of: a video access unit or an audio access unit.

10. The apparatus of claim 8, wherein the at least two streams comprise at least one of: a video stream and an audio stream.

11. A method for selecting splice opportunity points for a plurality of streams of the first data stream, the method comprising:
identifying an anchor stream with access units having the largest play duration among access units of each of the plurality of streams of the first data stream, wherein the anchor stream includes a plurality of access units;
determining a splice-in opportunity point and splice-out opportunity point within the anchor stream from the plurality of access units of the anchor stream;
determining splice opportunity points of at least one stream other than the anchor stream according to the splice-in opportunity point and splice-out opportunity point of the anchor stream,
wherein the determining splice opportunity points of at least one stream comprises calculating a variable $e_{ij}=|SOP_{anchor}(i)-SOP_n(J)|$ for a plurality of splice opportunity points of the $n^{th}$ stream, wherein the variable $e_{ij}$ calculates the difference between the presentation time stamp (PTS) value of $i^{th}$ splice opportunity point of the anchor stream and $j^{th}$ splice opportunity point of the $n^{th}$ stream.

12. The method of claim 11, wherein the access unit of the anchor stream has highest play duration among access units of the plurality of streams.

13. The method of claim 11, wherein the plurality of streams comprises at least one of: a video stream; an audio stream; and a PCR stream.

14. The method of claim 11, further comprising identifying a splice opportunity point of the $n^{th}$ stream for which the value of the variable $e_{ij}$ is minimum among the plurality of splice opportunity points of the $n^{th}$ stream.

15. An apparatus for selecting splice opportunity points for a plurality of streams of the first data stream comprises:
one or more processors and further comprising:
at least two stream splicing modules for the at least two streams, wherein a stream splicing module detects a plurality of splice opportunity points within a corresponding stream; and
a control module for identifying an anchor stream among the at least two streams of the first data stream, wherein the control module is configured to communicate with the at least two stream splicing modules to determine splice opportunity points for other stream in accordance with the splice-in opportunity point and splice-out opportunity point of the anchor stream,
wherein the determining splice opportunity points of at least one stream comprises calculating a variable $e_{ij}=|SOP_{anchor}(i)-SOP_n(J)|$ for a plurality of splice opportunity points of the $n^{th}$ stream, wherein the variable $e_{ij}$ calculates the difference between the presentation time stamp (PTS) value of $i^{th}$ splice opportunity point of the anchor stream and $j^{th}$ splice opportunity point of the $n^{th}$ stream.

16. The apparatus of claim 15, wherein the anchor stream includes splice opportunity point duration greater than the splice opportunity points of the other streams.

17. The apparatus of claim 15, wherein the at least two splicing modules utilize predictive algorithm to determine splice opportunity points for other streams.

18. The apparatus of claim 15, wherein the at least two splicing modules utilize iterative algorithm to determine splice opportunity points for other streams.

19. The apparatus of claim 15, wherein the at least two splicing modules utilize a combination of predictive algorithm and iterative algorithm to determine splice opportunity points for other streams.

20. The apparatus of claim 15, wherein the at least two splicing modules utilize an optimal grant algorithm to determine splice opportunity points for other streams.

21. The apparatus of claim 20, wherein the at least two splicing modules utilize a weighted predicted Splice Opportunity Points (SOP} algorithm.

* * * * *